(12) United States Patent
Miloslavsky

(10) Patent No.: US 6,418,146 B1
(45) Date of Patent: Jul. 9, 2002

(54) INTEGRATED COMMUNICATION CENTER FUNCTIONALITY FOR WAP DEVICES

(75) Inventor: Alec Miloslavsky, San Carlos, CA (US)

(73) Assignee: Genesys Telecommunications Laboratories, Inc., San Francisco, CA (US)

(*) Notice: Subject to any disclaimer, the term of this patent is extended or adjusted under 35 U.S.C. 154(b) by 0 days.

(21) Appl. No.: 09/549,449

(22) Filed: Apr. 14, 2000

Related U.S. Application Data
(60) Provisional application No. 60/172,848, filed on Dec. 10, 1999.

(51) Int. Cl.[7] .............................. H04B 7/00; H04J 3/24; H04L 12/66; H04M 7/00; H04M 3/00
(52) U.S. Cl. ................. 370/400; 370/310; 370/349; 370/352; 379/220.225; 379/265
(58) Field of Search ......................... 370/310, 328, 370/349, 352, 400, 401; 379/265, 207, 211, 210, 220, 225, 221

(56) References Cited

U.S. PATENT DOCUMENTS

| | | | | |
|---|---|---|---|---|
| 5,751,706 A | * | 5/1998 | Land et al. ............... | 370/352 |
| 5,751,707 A | * | 5/1998 | Voit et al. ................ | 370/384 |
| 5,841,854 A | * | 11/1998 | Schumacher et al. ....... | 379/265 |
| 5,920,621 A | * | 7/1999 | Gottlieb ................... | 379/265 |
| 6,055,307 A | * | 4/2000 | Behnke et al. ............ | 379/265 |
| 6,088,340 A | * | 7/2000 | Buchholz et al. .......... | 370/310 |
| 6,094,479 A | * | 7/2000 | Lindeberg et al. ......... | 379/220 |
| 6,185,535 B1 | * | 2/2001 | Hedin et al. .............. | 704/270 |
| 6,275,693 B1 | * | 8/2001 | Lin et al. ................. | 455/414 |
| 6,304,898 B1 | * | 10/2001 | Shiigi ...................... | 709/206 |

* cited by examiner

Primary Examiner—Wellington Chin
Assistant Examiner—M. Phan
(74) Attorney, Agent, or Firm—Donald R. Boys; Central Coast Patent Agency, Inc.

(57) ABSTRACT

A wireless access protocol service provider (WAP-SP), providing access to Internet data for WAP-enabled appliances is enhanced with software for facilitating telephony calls, enabling, for example, connection of a user of the WAP-enabled appliance, communicating with a Web site through the WAP-SP, to an agent of an enterprise that hosts the Web site.

11 Claims, 4 Drawing Sheets

INTEGRATED COMMUNICATION CENTER FUNCTIONALITY FOR WAP DEVICES

CROSS REFERENCE TO RELATED DOCUMENTS

This application claims priority to provisional application serial No. 60/172,848 filed Dec. 10, 1999.

FIELD OF THE INVENTION

The present invention in the field of telephony communication over dedicated and shared networks including wireless networks, and pertains more particularly to methods and apparatus for integrating wireless application protocol (WAP)-compliant communication devices to communication center routing and service functions.

BACKGROUND OF THE INVENTION

As Computer Integrated Telephony (CIT) systems become more sophisticated, and multimedia communication becomes more pervasive, increasingly sophisticated call centers are being developed wherein multimedia communication of many sorts is used by agents in addition to conventional telephony techniques. Companies are developing multimedia communication methods and are beginning to integrate these methods within the call center environment. These developments have produced a new breed of multimedia agent to handle communication with the aid of advanced software-communications programs. Agents within call centers who once handled only telephone communications are now required to handle a variety of communications such as, but not limited to E-mail, Video mail, Video calls, and data network calls such as Internet protocol telephony (IPT) calls.

A multimedia agent for purposes of this specification is an agent in a call center charged with handling various communications transactions, and who has access to multi-communication mediums, hence, the term multimedia. A multimedia agent may work in a call center set up for technical service, sales, management, or for any other purpose for which call centers are used.

As described above, many of the newer mediums of communication that may be employed by a multimedia agent involve some type of computer integration. In such call centers agents are typically provided with computerized workstations, including a computer, which may be a personal computer, and a video display unit, hereinafter PC/VDU. In such call centers known to the present inventor, the agents' PC/VDUs are interconnected on a local area network (LAN), which may also connect to one or more processors in turn connected to a telephony switch to which the agents telephones are connected. Through sophisticated computer techniques integrated with the requisite hardware, multimedia capability for the agents is achieved.

A multimedia agent working in a call center such as described above is assigned to a workstation as described, and the workstation, together with software accessible on the LAN presents graphic user interfaces (GUIs) for displaying information relating to each communication transaction handled by that particular agent. For example, along with normal phone capabilities, the agent may be capable of sending and receiving E-mail, Video mail, and the like. Video conferencing may also be a part of an agent's transaction protocol. Similarly, a caller to such an agent may have a PC connected on-line, or to a network accessible to the agents, and thus be enabled to send and receive E-mail, video calls, or any other multimedia communication that the agent may host. As well, callers may be accessing the agent from a normal analog telephone where only voice mail capabilities and conventional telephony audio services are utilized.

Call routing to and within call centers involves computerized platforms and software dedicated to directing a caller to an appropriate agent for the purpose of fulfilling the purpose of the caller. Such routing is known to the present inventor as agent-level call routing. Routing of calls, then, may be on several levels. Pre-routing may be done at Service Control Points (SCPs) and further routing may be, and typically is, accomplished at individual call centers. A call center typically involves a central switch, which may be, for example, a Private Branch Exchange (PBX), or PSTN switch. The central switch is connected to the public-switched telephone network (PSTN), as is well-known in the art. Agents, trained to handle customer service, occupy agent stations connected by telephone lines to the central switch, and connected in this example to file servers and the like on a LAN. In more advanced call centers, more appropriately termed communication centers, callers may be practicing data network telephony (DNT) wherein an IP router is provided within the communication center and functions much like a central telephony switch. IP calls are routed to agents PC's or DNT capable telephones using rules similar to connection oriented switched telephony (COST).

As described above, multimedia communication methods are emerging as applicable methods of communication within call centers. For example, E-mail programs, video calls, IPT calls, and the like can be utilized by agents in addition to voice mail and more conventional connection. In some cases agents are also connected to the Internet for purposes of communicating with other agents, accessing additional information not hosted in the call center, or even for the purpose of contacting or responding to Internet-sourced inquiries. It is to such multimedia-capable communication centers that the present invention is addressed.

An emerging technology known in the art as wireless application protocol (WAP) has been developed for the purpose of enabling users operating certain wireless communication devices to access and interact with the well-known Internet network or other DPN's in a more optimized fashion. WAP protocol is a joint development of a consortium of companies representing the arts of telephony, Internet access, wireless communication, and device manufacture. The purpose is to facilitate small, wireless communication devices such as a cell-phones, hand-held computers like the Palm Pilot™, paging devices, or other such devices to interact with the Internet network, through proxy in most cases, and to download data that is maximized for use on the specific requesting device.

Data that is delivered from the Internet over a wireless network to WAP-compliant devices by WAP protocol may be presented in a variety of device and network-specific formats designed to optimize functionality over the relatively low bandwidth connections typical of wireless networks. For example, micro WEB-browsers are employed in WAP-compliant devices wherein special versions of hyper-text markup-language (HTML), which are known in the art and understood by the browser may be used to provide optimum data-access capabilities and data-display modes according to device-specific rules and parameters. One of these protocols is WML. These sub-protocols are included into WAP protocol as a whole to produce a standardized application, which is periodically expanded with development of new communication protocols and integration of new types of devices and wireless network technologies.

WAP is designed in part for enhancing multi-media communication between devices operating on wireless telephony networks and sources of information stored on Internet-connected servers, an Intranet, or other data-packet-networks (DPN). The inventor has discovered that there is currently no method or apparatus for integrating WAP functionality with communication center routing and data service functions.

What is clearly needed is a method and apparatus that allows a seamless and enhanced integration between users operating WAP-compliant devices and communication centers connected to or affiliated with data-network-based services whereby additional information about users may be passed to such service centers for improved routing. Such integration would allow a user to receive personalized customer care from a live agent within a communication center in relation to a user-initiated WAP transaction, in many cases, during transaction of such services.

SUMMARY OF THE INVENTION

In a preferred embodiment of the present invention an Internet-connected wireless access protocol service provider (WAP-SP) is provided, comprising a wireless communication interface for communicating with a WAP-enabled appliance; a telephony communication interface; and a software suite. The WAP-SP is characterized in that the software suite presents an interface to a user at the WAP-enabled appliance, enabling the user to initiate a call, and then routes the call according to pre-programmed rules in response to the user initiation.

In one embodiment the telephony interface is an Internet connection, and the calls placed and routed are IPNT calls in the Internet. In another there is a connection-oriented switched-telephony (COST) trunk line into a public-switched telephony network (PSTN), and the calls placed and routed as calls in the PSTN.

In a preferred embodiment there is a data repository wherein user data is stored, and, in placing calls, data associated to the user initiating the call is retrieved and sent along with the call. In some embodiments there is CTI link and a CTI processor connected to the CTI link, and at least the routing portions of the software execute on the CTI processor. The CTI processor may comprise a separate data network link other than the telephony communication interface, the separate link to at least one call destination for routing telephony calls initiated by the user.

In another aspect of the invention a system for routing telephony calls initiated by a user of a wireless application protocol (WAP)-enabled device is provided, comprising a software-enhanced WAP service provider (WAP-SP) connected to the Internet, connected by WAP protocol to the WAP-enabled device, and connected to a telephony network; an Internet-connected server hosted by an enterprise; and a call center connected to the telephony network and hosted by the enterprise. The system is characterized in that the WAP-SP, by virtue of the software enhancement, enables the user to request a telephony connection to the call center, and routes the requested call via the telephony network to the call center.

In some cases of the system the telephony network is the Internet, the calls routed are Internet-protocol network telephony (IPNT) calls, and the call-center is enabled to handle IPNT calls. In some other cases the telephony network is a public switched telephone network (PSTN) and the call center is enabled to handle PSTN calls. In still other cases both networks are available for routing calls.

In some embodiments of the system the call center comprises a telephony switch connected to a first CTI processor, the WAP-SP is connected to a second CTI processor, the WAP-SP is connected to a public-switched telephone (PSTN) network having a network level switch, and the first and second CTI processors are connected by a dedicated data link separate from any telephony connection. Data associated with the user may be transferred over the dedicated data link to the call center parallel to a call routed via the telephony network.

In some embodiments there may be a third CTI processor connected to the network-level switch, wherein the three CTI processors are interconnected by the dedicated data link. In some of these embodiments the call center further comprises an IPNT data router connected to the Internet for routing IPNT calls to agent stations, and the IPNT data router is connected to a fourth CTI processor interconnected with the first, second and third data routers by the dedicated data link.

In another aspect of the invention a method for placing a telephony call by a user of a WAP-enabled appliance to a call center hosted by a host of a WEB service is provided, comprising steps of (a) connecting to a hosted WEB service by the WAP-enabled appliance through a wireless-application protocol service provider (WAP-SP); (b) initiating a call by the user at the WAP-enabled appliance through an interface provided by the WAP-SP; and (c) placing the call to a call center hosted by the host of the Web service through a telephony network connected to the WAP-SP.

In some embodiments of the method, in step (c) the telephony network is the Internet, and calls placed are Internet Protocol Network Telephony calls. In other embodiments the telephony network is a connection-oriented switched-telephony (COST) network, and the calls placed and routed are calls in the COST network.

In further embodiments of the method a step (d) is provided for retrieving data associated with the user from a data store accessible to the WAP-SP, and for forwarding the data with the call. In some embodiments there is a CTI processor connected by a CTI link to the WAP-SP, and at least some telephony functions are provided by software executing on the CTI processor. The CTI processor may have a separate data network link, other than the telephony network, to a CTI processor at the call center, and a step (d) is provided for retrieving data associated with the user from a data store accessible to the WAP-SP, and forwarding the data with the call over the separate data network link.

In embodiments of the present invention, taught in enabling detail below, for the first time, users of WAP-enabled devices, communicating with Web sites through a WAP service provider, are enabled to place telephone calls to agents of the host of the Web site.

BRIEF DESCRIPTION OF THE DRAWING FIGURES

DESCRIPTION OF THE PREFERRED EMBODIMENTS

Figure 1:
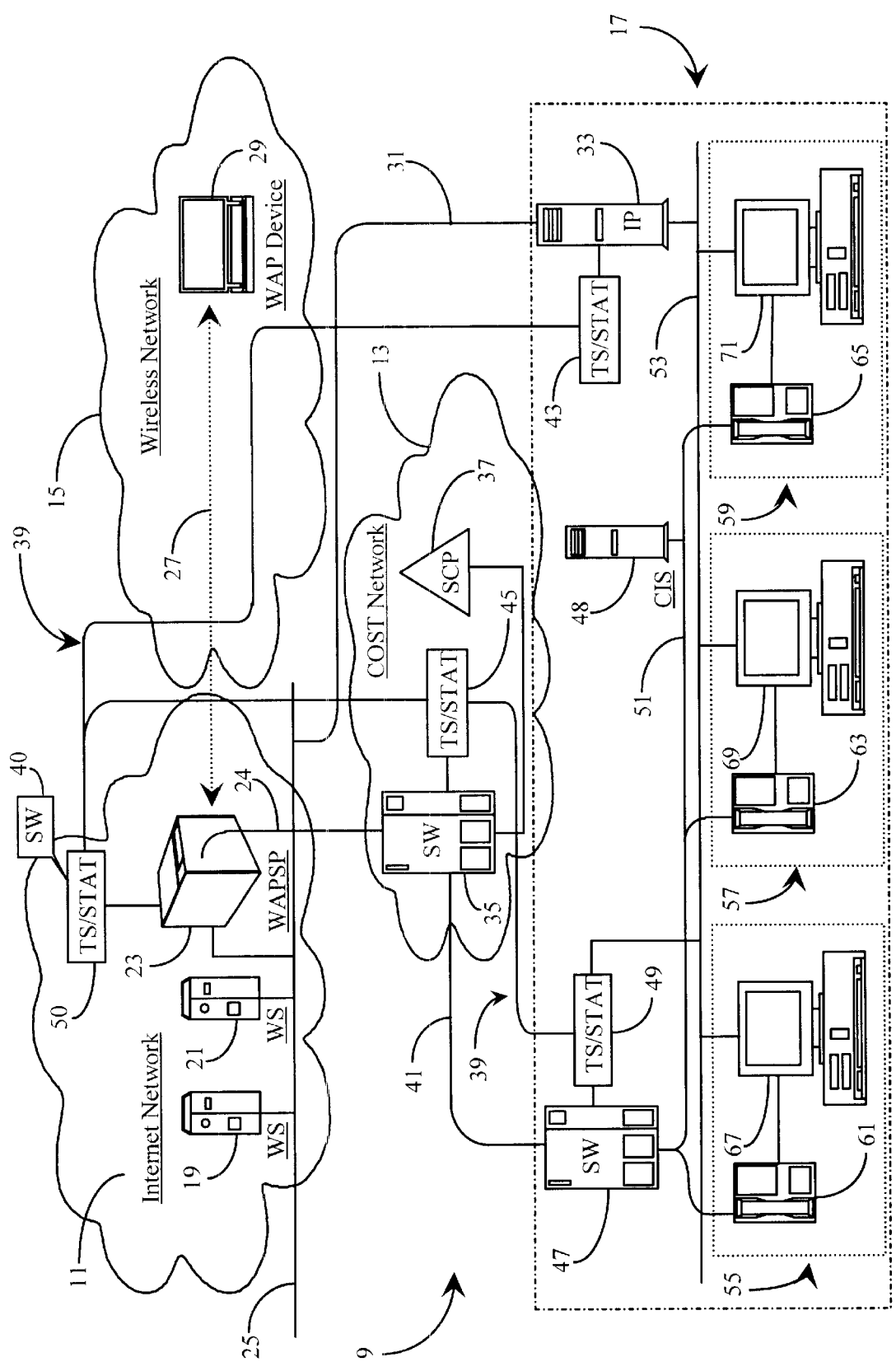
FIG. 1 is a general overview of a communications network and communications center integrated with WAP and enhanced routing functionality according to an embodiment of the present invention.

FIG. 1 is a general overview of a communications network 9 and communications center 17 integrated with WAP services and enhanced routing functionality according to an embodiment of the present invention. Communications network 9 comprises an Internet network 11, a wireless communication network 15, a connection-orientated switched-telephony (COST) network 13 and a communication center 17.

Internet 11 may be any type of data packet network (DPN) other than the Internet as long as the appropriate communication protocols are enabled. Examples include a corporate or private wide area network (WAN), local area network (LAN) and so on. The Internet network is chosen in this example as a preferred medium because of a large public-access characteristic, which lends practicality in the practice of the present invention.

An Internet backbone 25 is illustrated within Internet 11 and is intended to represent the many connection points, lines and sub-nets making up the Internet network as a whole in a global sense. Two WEB servers (WS) 19 and (WS) 21 are illustrated within Internet 11 and shown connected to backbone 25, representing the wide assortment of Internet-connected servers in the Internet domain. Servers 19 and 21 represent WEB-based services such as, perhaps a banking service and an airline service. There are many variant possibilities. Servers 19 and 21 are enabled to serve electronic information pages termed WEB pages in the art as well as provide interactive services such as ordering products, booking airline flights, banking services, or any other services provided by the server hosting enterprises. Servers 19 and 21 are assumed in this example to be hosted by communication center 17.

WEB-services provided by servers 19 and 21 are, as known in the art, available to users operating appropriate Internet-enabled appliances and software and having an on-line connection. The most common method for on-line access to servers 19 and 21 is through a personal computer connected to the Internet through telephone trunks and an Internet service provider (ISP) and having network navigation software (WEB browser). Servers 19 and 21 serve WEB-pages composed typically in hyper-text-markup language (HTML) or a variation thereof, which is standardized for network data transmission and device display parameters.

A WAP service provider (WAP-SP) 23 is provided within Internet 11 and shown connected to backbone 25. WAP-SP 23 is an enhanced proxy server that, among other things, functions as an Interface to users accessing the Internet through WAP-enabled wireless communication devices. One such device is WAP device 29 illustrated within wireless network 15.

In a conventional sense, WAP-SP 23 is dedicated to enabling Internet navigation and data transmission between servers 19 and 21 and an exemplary user operating WAP-enabled device 29. Network 15 represents an exemplary wireless network that is available to a specific WAP device or a variety of WAP devices. Network 15 may be a cellular network supporting a number of communication technologies such as code division multiple access (CDMA), time division multiple access (TDMA), global service mobile (GSM), and so on.

WAP-enabled device 29 illustrated within network 15 represents any one of a varied lot of different WAP-enabled devices that may be used to access Internet 11. In this example, device 29 is a laptop computer, however, cell phones, fixed wireless telephones, paging devices, palm computers, and a host of other devices may also be WAP-enabled Internet-capable appliances. Dotted double-arrow 27 represents an exemplary wireless data-connection between device 29 and WAP-SP 23.

COST network 13 represents, in this example, a well-known public-switch-telephone-network (PSTN). However, private or corporate telephony networks may also be used to practice the present invention. The inventor chooses the PSTN network because of its large public-access characteristic, which lends to practicality of the present invention.

Network 13 comprises a service control point (SCP) 37, a network-level telephony switch (SW) 35, and a CTI processor running an instance of transaction server/statistical server (TS/STAT) 45 (known to the inventor). Network 13 is assumed to further contain a host of other telephony-related equipment such as data routers, network bridges and so on. However, the inventor deems the equipment illustrated herein is adequate for explaining the present invention.

SCP 37 is a computerized facility that controls certain aspects of call routing at switch 35 such as routing 1-800 and 1-900 calls arriving at switch 35. SCP 37 is illustrated as connected to switch 35 by a data link. Switch 35 may be an ACD type or other type of available telephony switching apparatus as are generally known in the art. TS/STAT 45 is an enhanced CTI routine adapted to provide executable network-level-routing intelligence to switch 35. Along with normal CTI routines, enhanced "agent level routing" routines are provided by TS/STAT 45 in some embodiments of the invention. Capabilities such as routing based on agent skill, agent availability, statistical routing, priority routing, and others may be attributed to switch 35 by virtue of the addition of TS/STAT 45. The equipment group exemplified by switch 35, SCP 37 and processor 45 represents "state of the art" CTI telephony capabilities attributed to the "network level" as known to the inventor.

An equipment grouping similar to that represented in network 13 is illustrated as residing within communication center 17 and connected to the aforementioned network-equipment grouping. The second grouping comprises a central telephony switch (SW) 47, and a CTI processor 49 running an instance of TS/STAT server. Processor 49 is connected to switch 47 by a CTI link. Processor 49 is connected to processor 45 in network 13 by a separate digital data network 39. Telephony switch 47 is connected to switch 35 in network 13 by at least one COST telephony trunk 41. By adding a separate data network (39) to connect CTI processors, information about a caller may be passed to agents ahead of the actual COST call arriving over trunk 41. Enhanced routing routines provided by TS/STAT instances 49 and 45 allow for agent level routing from the network level as previously described. Data network 39 represents a data network for communication between instances of TS/STAT and for passing other digital data.

A plurality of agent workstations, station 55, station 57, and station 59 are illustrated within communication center 17. In actual practice there would be many more agent workstations in center 17, however, the inventor deems that the illustration of three such stations is sufficient for the purpose of explaining the present invention. Each agent workstation has therein a telephone and a personal computer/video display unit (PC/VDU) as exemplified herein with telephone 61 and PC/VDU 67 comprising station 55. Station 57 has telephone 63 and PC/VDU 69. Station 59 has telephone 65 and PC/VDU 71. In this example, each station 55-59 is identical in illustration. However, there may be differences in actual equipment employed with respect to agent stations such that they may not be identical to each other. It is assumed at least that each station will have a computer terminal and a telephone.

Stations 55–59 are each connected to a LAN 53 by respective LAN connections (one at each station). LAN 53 in this embodiment is adapted for internal communication and Internet communication. Therefore, LAN 53 may be considered as a sub-net of network 11. Agent telephones 61–65 are connected to central switch 47 by internal COST wiring 51. Alternately, telephones 61–65 may be adapted as data network telephony (DNT)-capable telephones by provision of data connections and integration to respective PC/VDU's 67–71 as illustrated. In this example telephones 61–65 may be used for either COST or DNT telephony depending on demand within center 17. An IPT router 33 is provided within center 17 and adapted to receive incoming DNT communication events. Router 33 is connected to backbone 25 by an Internet access line 31.

A customer information system (CIS) server 48 is illustrated within center 17 and connected to LAN 53. CIS server 48 is adapted to contain and serve information about customers such as account histories, personal information, and the like. Data stored in server 48 is accessible through LAN 53 and is available to any requesting agent operating one of LAN connected stations 55–59. Such customer information systems are known in the art and common in LAN-capable communication centers.

General communication capabilities and communication routes are attributed to overall network 9. For example, incoming COST calls from network 13 may be routed to switch 47 and are internally routed to agent's telephones 61–65 over wiring 51. Incoming DNT calls from network 11 received by IPT switch 33 illustrated within center 17 and are internally routed over LAN 53 to agent's PC/VDU's 67–71. DNT communication may also be received by agent telephones 61–65. IPT switch 33 is adapted for routing DNT communication including but not limited to IP telephony, e-mail, video mail, chat events, and so on. IPT switch 33 is connected to backbone 25 by an Internet access line 31, which facilitates a continuous network connection in a preferred embodiment. Communication center 17 is a dual-capable center in this example, however a COST-only or DNT-only center may also practice the present invention.

WAP-SP 23 is adapted as a software-enhanced, WAP-enabled proxy server with COST and DNT telecommunication capabilities. CTI and DNT communication and routing software capabilities are provided by a processor 50 running an instance of TS/STAT as described with telephony switches 35 in network 13 and 47 in center 17. Enhancing software is indicated by SW 40 in FIG. 1. It should be apparent that software functions may be provided by software executing on server WAP-SP 23 or on T-Server 50, or on both. Hardware and software dedicated to facilitating out-bound call-dialing is provided to enable WAP-SP 23 to initiate and facilitate telecommunication events on behalf of users operating WAP-enabled devices such as laptop 29. WAP-SP 23 has a COST trunk 24 connected thereto and also connected to telephony switch 35 in COST network 13. WAP-SP 23 is therefore enabled to initiate calls into standard telephony networks and equipment from its Internet location. WAP-SP 24, by virtue of being an Internet-connected server may also, with suitable software place DNT calls on the Internet backbone.

To further illustrate the capabilities described above, consider a user operating WAP device 29 and connected to WAP-SP 23 via wireless link 27 as illustrated in this example. Such a user may desire to place a cost call to an agent working at one of stations 55–59 in communication center 17, and communicates this desire to WAP-SP 23 via a suitable interface. WAP-SP 23 dials the provided number and establishes a COST connection through trunk 24 to switch 35, which is connected through trunk 41 to a routing point in switch 47. From switch 47, the call is routed internally over wiring 51 to the appropriate station 55–59 initiating a ringing event on the appropriate telephone 61–65.

WAP-SP 23 is further adapted to manage data about users and store such data on behalf of users based on prior knowledge and agreement between users and the enterprise hosting the WAP-SP proxy service. Data about users that is stored at WAP-SP 23 may include but is not limited to user-personal data, user WEB-site data, account information, transaction histories, credit card numbers, or any other type of transferable data. WAP-SP 23 may store data about users internally or on any connected data repository (data storage facility not shown) as is generally known in the art of storing data.

Using data-access and management capabilities in conjunction with telecommunication capabilities, WAP-SP may initiate or facilitate a COST call to one of agents operating within center 17 as described above. In addition to facilitating the call, server 23 may also access stored data about a user placing the call, and send it to a same agent (receiving COST call) over Internet access line 31 to IPT switch 33. From IPT switch 33, the data, keyed to the routing point ID of the COST call placed, is routed internally over LAN 53 to the target agent. Similarly, WAP-SP 23 may initiate an IPNT call on behalf of a user wherein additional data about the user placing the call may be merged with and sent with the call over line 31 to switch 33, and then be routed over LAN 53 to a suitable agent.

Processors 45 and 49, as previously described, enable intelligent routing decisions to be made at network level (COST network) with regard to callers calling center 17 from anywhere within COST network 13 or from any PC connected to Internet 11. DNT to COST connections may be accomplished with the aid of network-bridging techniques, (not detailed in this example), but known to the inventor. In a background sense, such enhancements are available and known to the inventor. For example, a DNT/COST network bridge may be available to both WEB servers 19 and 21 such that DNT callers connected to Internet 11 may place a COST call to center 17 while visiting either server. The call would be initiated at server 19 or 21 and be routed through the bridge to switch 35 in network 13 for further routing.

One of the features that is novel and unique about the present invention is the fact that through WAP-SP 23, users operating low-bandwidth devices, which are WAP compliant, may now enjoy much of the same enhancement in call routing and quality of service that standard COST or (to a lesser extent) Internet-based callers enjoy. This is accomplished by the ability to place a call through WAP-SP 23, enhanced by software 40, and have additional data designed to enhance service to the caller forwarded to the ultimate call destination via separate or the same routing path.

WAP-SP 23 is enhanced for intelligent data routing according to the present invention through the extension of TS/STAT capability as exemplified by connected processor 50 and an extension by separate data network 39, which may be used to pass digital data. For example, data network 39 interconnects all of the CTI servers in the overall network. This enhancement along with added dialing capabilities, data profiling services, and WAP functionality, provide users operating WAP devices with several abilities not available in prior art WAP communication services.

By adding enhanced software capability to WAP-SP 23, for example by server 50, additional data sent over DNT connections may be tagged with the same routing instructions as a COST call in progress and then sent by varied data routes. Therefore, an agent operating within communication center 17 may receive a COST call from a WAP user and also receive a screen-pop containing additional data related to the call. The additional data transfers may be brokered by proxy according to prior agreement between WAP users and the service. For example, if a user operating device 29 places a COST call to an agent working at station 55, any additional data transferred from WAP-SP 23 over access line 31 to IPT 33 would be routed to station 55. This is accomplished by virtue of communicating instances of TS/STAT on processors 50 and 43 using separate network 39 as a command communication medium. Moreover, data network 39 may also be used to pass the additional data instead of using the traditional Internet backbone 25 and access line 31. However, an IPT data-router would be required to receive the data before routing it to the appropriate agent over LAN 53.

If a user operating device 29 is visiting WEB service 21 to perform an on-line transaction, he may need to contact an agent within center 17 for assistance. In this example it is assumed that the call center and server 21 have the same host. An IPT call may be initiated from server 21 to IPT 33. TS/STAT 43 communicates with TS/STAT 50 to advise WAP-SP 23 how best to route the IPT call and additional data about the call according to current agent status within center 17. There are many possibilities. It will be appreciated by one with skill in the art that the addition of TS/STAT processors and network 39 into network 9 enables intelligent call routing and passing of related data using a greater number of paths to the ultimate destination. More detail about various routing options is provided below.

Figure 2:
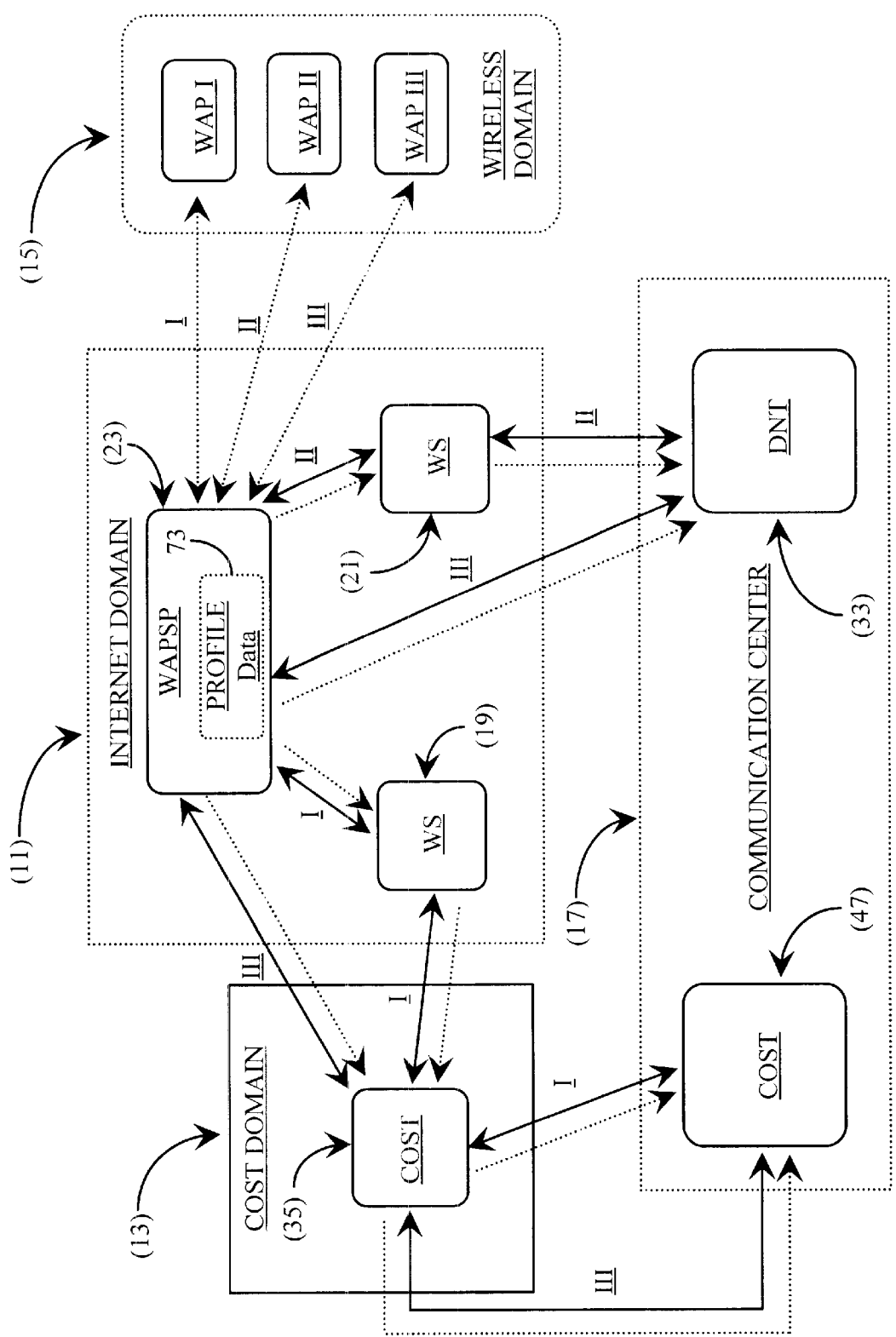
FIG. 2 is a block diagram illustrating various interaction paths or routes of communication possible between WAP users and the communication center of FIG. 1 according to an embodiment of the present invention.

FIG. 2 is a block diagram illustrating various interaction paths or routes of communication possible (and that may or may not be implemented) between WAP users and communication center 17 according to an embodiment of the present invention. This example generally follows the physical data paths and equipment connections illustrated in FIG. 1 above. One with skill in the art will be able to relate the routing and data-path options presented in this example with the physical network described in FIG. 1 and with added connections not illustrated in FIG. 1 but known to be possible in the art.

In network 15 there are illustrated three WAP-compliant devices. These are labeled WAP I, WAP II, and WAP III. Three dotted double-arrows also labeled I–III represent wireless links from respective devices I–III to WAP-SP 23 within Internet domain 11. Each WAP device and the corresponding arrows represent at least one routing option made possible by the methods and apparatus of the present invention.

Taking now the example of WAP device I, wireless connection I is established between WAP I and WAPSP 23. Because WAP I is a personal communication device, it has a unique ID-set. Moreover, a user operating WAP I must log-in to WAP-SP 23 with (typically) a user name and password pair for authentication purposes. This is to protect the secure nature of the operating environment wherein user data may include personal data. Once authenticated, WAP I is cleared to browse Internet 11.

WAP-SP 23 manages profile data on behalf of users as was described in FIG. 1. This data is illustrated by a dotted rectangle labeled "profile". In the example of WAP I, the device is being used to browse contents at WEB-server 19 as is illustrated by the double arrow labeled I. The accompanying dotted arrow represents profile data forwarded to WEB server 19 by WAP-SP 23. This data is related to the type of business being conducted with server 19 and may or may not be required depending on the type of transaction. During the session between WAP I and server 19, a COST call is initiated by WAP I to an agent operating within center 17, which hosts server 19. The reason for the COST call request may be that a user requires live assistance in completing a WEB-based transaction. In this case, an interactive link enabling COST communication to center 17 is provided within server 19 embedded in an electronic WEB page as is known in the art.

The COST call is made through an appropriate network bridge to switch 35 in COST domain 13. WEB server 19 forwards additional data about the call either to COST equipment grouping (35), which in this case would be enhanced with a data connection to Internet 11, or over backbone 25 and line 31 to IPT 33. Because WS 19 is hosted by center 17, the latter-mentioned route for sending additional data (backbone 25 and access line 31 FIG. 1) is appropriate. The ultimate destination for the COST call and the additional digital data is pre-known such that when the COST call arrives at center 17, it may be matched with the additional data (tagged to the call) sent to IPT 33 within the center. In most cases, the digital data will arrive at the same time or ahead of the call.

If there is more than one call center sharing server 19 then an Internet connection must exist between network 11 and COST equipment (35) so that the additional data can be routed in parallel with the COST call as is illustrated in this example. In the case of more than one center, determination for which center to route the call to will be made in COST domain 13. Ultimately, call I and the additional data are routed in parallel or with digital data arriving by a separate route to the appropriate receiving equipment within center 17.

Additional data related to call I may also be passed to center 17 through separate network 39 of FIG. 1. In this case, an Internet connection must exist between Internet 11 and COST equipment (35). Additional data may at that point be passed over network 39 to LAN 53. However, an IPT switch would be added to receive the data for routing purposes.

WAP II is logged on to WAP-SP 23 as illustrated by a double arrow II. A second double arrow II illustrates that WAP II is accessing WEB-service 21. WAP-SP 23 passes additional profile data related to a user's business at server 21 over backbone 25 to server 21. A user visiting server 21 may decide to initiate a DNT call to center 17 to enlist live aid with his or her WEB-based transaction. In this case, the DNT call and associated data are passed over backbone 25 and line 31 to IPT 33 within center 17. From IPT 33, the data and call are routed internally over LAN 53 to one of stations 55–59 (FIG. 1). In this case, intelligent routing by virtue of processor 43 is only available for internal routing to a LAN-connected agent. This is because WEB server 21 is not enhanced with TS/STAT.

WAP III shows two additional routing options. For example, WAP III connects to WAP-SP 23 via wireless link III as illustrated. After successful log-on, a user desires to make a direct COST call to center 17 for immediate customer care. A double arrow III beginning within Internet domain 11 and progressing into COST domain 13 illustrates this scenario. In this case, WAP-SP 23 is enhanced with processor 50 running an instance of TS/STAT wherein processor 50 is connected by network 39 to processor 45 in COST network 13. Therefore, the COST call may arrive over trunk 24 (FIG. 1) while the additional profile data travels in parallel over network 39. Full intelligent routing capabilities are possible.

Parallel routing is also available between COST domain 13 and center 17 by virtue of trunk 41 and network 39 (FIG. 1). Again, a means for internally routing the digital data would be provided between processor 49 and LAN 53. In one embodiment, processor 49 may be additionally enhanced for routing the additional data over LAN 53 (FIG. 1) to the target agent.

Yet another option provided to WAP III is placing a direct DNT call from WAPSP 23 to center 17 as illustrated by the double arrow III placed between server 23 and IPT 33 (DNT) within center 17. In this case, there are two paths that may be used. One is over Internet backbone 25 to access line 31, and the other is over separate network 39 illustrated in FIG. 1 as connecting processors 50 and 43. Intelligent routing is Available for both routes. Moreover, a DNT call may be routed over backbone 25 to line 31 while the additional data is passed over network 39.

It will be apparent to one with skill in the art that there are many call routing and data transfer possibilities available within the communication network illustrated in FIGS. 1 and 2 without departing from the spirit and scope of the present invention, as long as the appropriate connections, equipment and protocols are provided. Intelligent routing can also be extended into Internet domain 11 by extending TS/STAT capability and separate network 39 to WAP-SP 23 as illustrated in FIG. 1. Moreover, existing WAP protocols and technologies provide enhanced functionality to WAP users making use of the enhanced routing and data transfer capabilities practical in communication.

Software enhancements provided by TS/STAT, data access, management and transfer capabilities, as well as provisions for enabling COST and DNT communication initialization provide a proxy system that optimizes functionality for WAP users. Such a system is not available in prior art communication networks. More detail about enhanced function provided to WAP-SP 23 of FIG. 1 is provided below.

Figure 3:
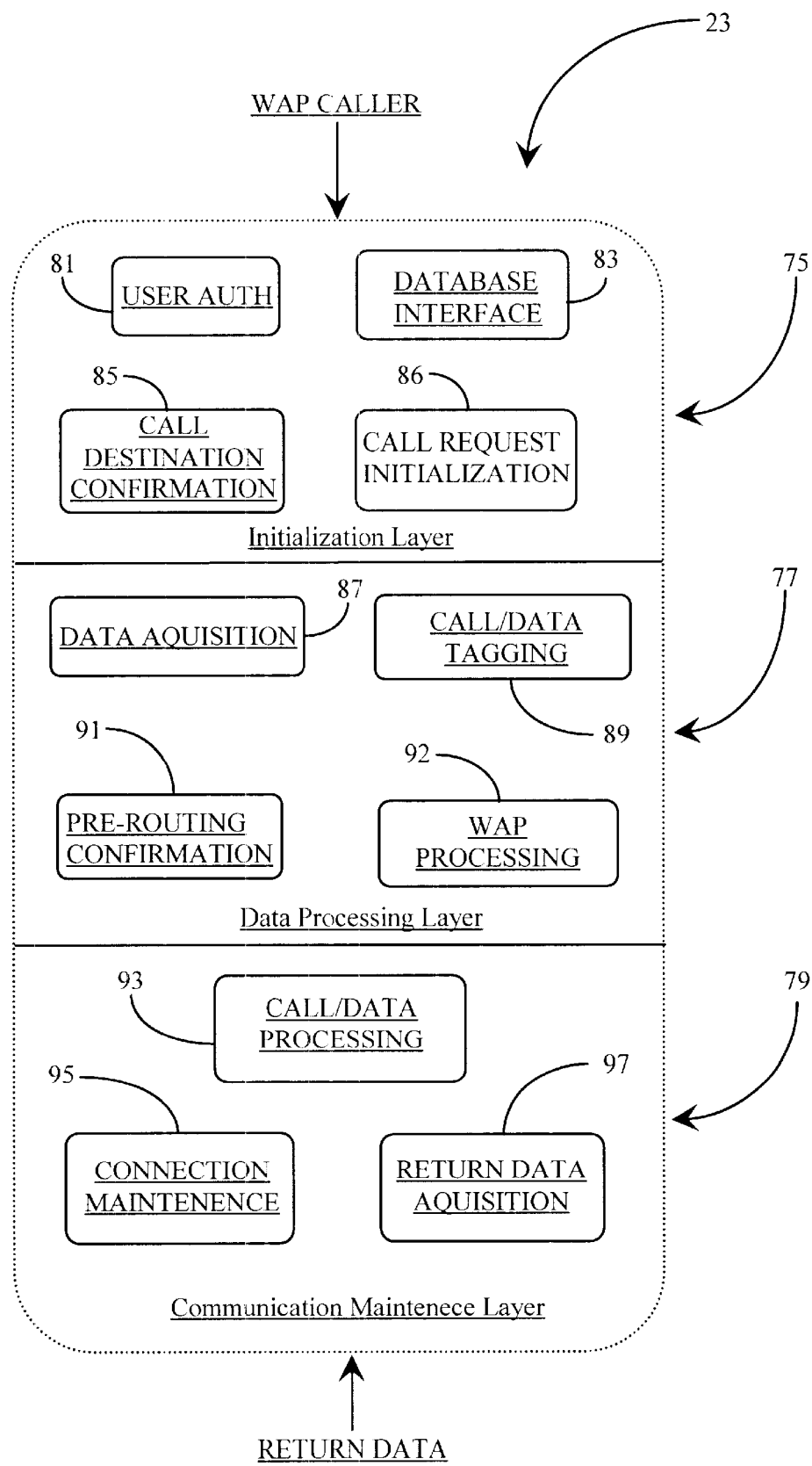
FIG. 3 is a block diagram illustrating call/data initialization and transfer capabilities of a WAP Service Provide shown in of FIGS. 1 and 2 according to an embodiment of the present invention.

FIG. 3 is a block diagram illustrating call/data initialization and transfer capabilities of WAP-SP 23 according to an embodiment of the present invention. WAP-SP 23 performs several functions and services for WAP users communicating, on network 9 (FIG. 1). One of importance to the present invention is the function of enabling telephony connections and data transfer capability for users who are engaged in a third-party transaction. For this function, WAP-SP 23 may be considered to have three basic software layers. These are layer 75 (Initialization Layer), layer 77 (Data Processing Layer), and layer 79 (Communication Maintenance Layer).

It is important to note here that all three layers continue to function on behalf of a user while a third party connection is open. Layer 75 comprises a means for identifying a WAP user illustrated herein as a block labeled (81). A directional arrow labeled (WAP CALLER) at the top-center of the diagram illustrates initial user input. Means 81 may be an authentication process such as noting an identification code for the wireless device used and/or requiring a user name and password for authenticating the user. It is known in the art that wireless devices may be assigned at least temporary network identification codes.

Once authenticated, a user may access services. A means for interfacing to a database or databases is provided and illustrated as block 83. Interface 83 may be used to access any connected data repository that stores data about a user and/or other data that may be used to enhance telecommunication function. In this example, the described data will be assumed to be profile data about a call-requesting user.

If a user desires to place a third-party call through WAP-SP 23, a means for confirming call destination illustrated as block 85 is invoked. Means 85 may be coordinated with means 83 in order to access call lists or supported destination numbers held in storage. Once a third-party number or destination is confirmed, a means for initializing a user call-request (86) is invoked to request a connection.

Layer 77 begins data processing once a third party grants a call request. A means for data acquisition (87) is provided for accessing data determined by rule to be sent along with the call. The type of data sent along with a call is determined by pre-agreement between a user and the service. Personal data is, of course, encrypted for data transmission over a network. A secure socket layer (SSL) connection may be used for this purpose as is common in the art of Internet data transfer.

A means for tagging data to a call (89) is provided and adapted to associate data being transferred, in many instances via alternate route from a call, to a call in process. Any known means for accomplishing this process may be employed and many techniques are known in the art of telecommunication. Caller line identity (CLID) and automatic number identification (ANI) are two known methods. Moreover, wireless device ID sets may be employed as well as newly conceived tagging methods.

Once data is ready for transfer, a means for confirming pre-routing instructions (91) is invoked for the purpose of verifying planned data routes. In many cases, a COST call will be in progress and additional data must be sent separately over a data connection. Pre-confirming a data route involves network management techniques such as reservation service verification protocol (RSVP), as well as other known conventions. Intelligent routing routines may also play a part in selecting a data rout for both COST and DNT transactions. Securing optimum data routes for digital transfer is an ongoing process. Therefore, it is conceivable that many associated data packets will arrive at their ultimate destination over variable routes.

A means for WAP processing 92 is provided and adapted for structuring data according to device and network receiving the data. It is important to note here that means 92 is more often invoked for data returning to a WAP user. However, if data transferred with a call is destined to another WAP-compliant device, then outgoing data would be re-structured for the receiving device.

Layer 79 manages ongoing communication and data transfer connections. A means for call/data processing (93) is provided for the purpose of coordinating any additional data requirements during an ongoing call. For example, a third party may request data not originally sent by WAP-SP 23 at the time of third-party connection. This provides a means for updating data as required. A means for maintaining DNT and data transfer connections (95) is provided and adapted to continually monitor open connections for low bandwidth conditions and to adapt by changing routes where possible. A means for receiving data returned during a transaction (97) is provided for the purpose of accepting digital data addressed back to the device of the requesting user. Such data after receipt is processed according to appropriate WAP protocol if required.

It will be apparent to one with skill in the art that the term means, as used in this example, is generally descriptive of software components that may range from simple to complex in design and application and may be capable of more than one or a few functions. The inventor intends that this simple block diagram illustrate just one functional application that may be implemented to facilitate a third party connection and data transfer process between a user operating a WAP device and a third party entity providing service to the user with communication and data transfer brokered by server 23.

Figure 4:
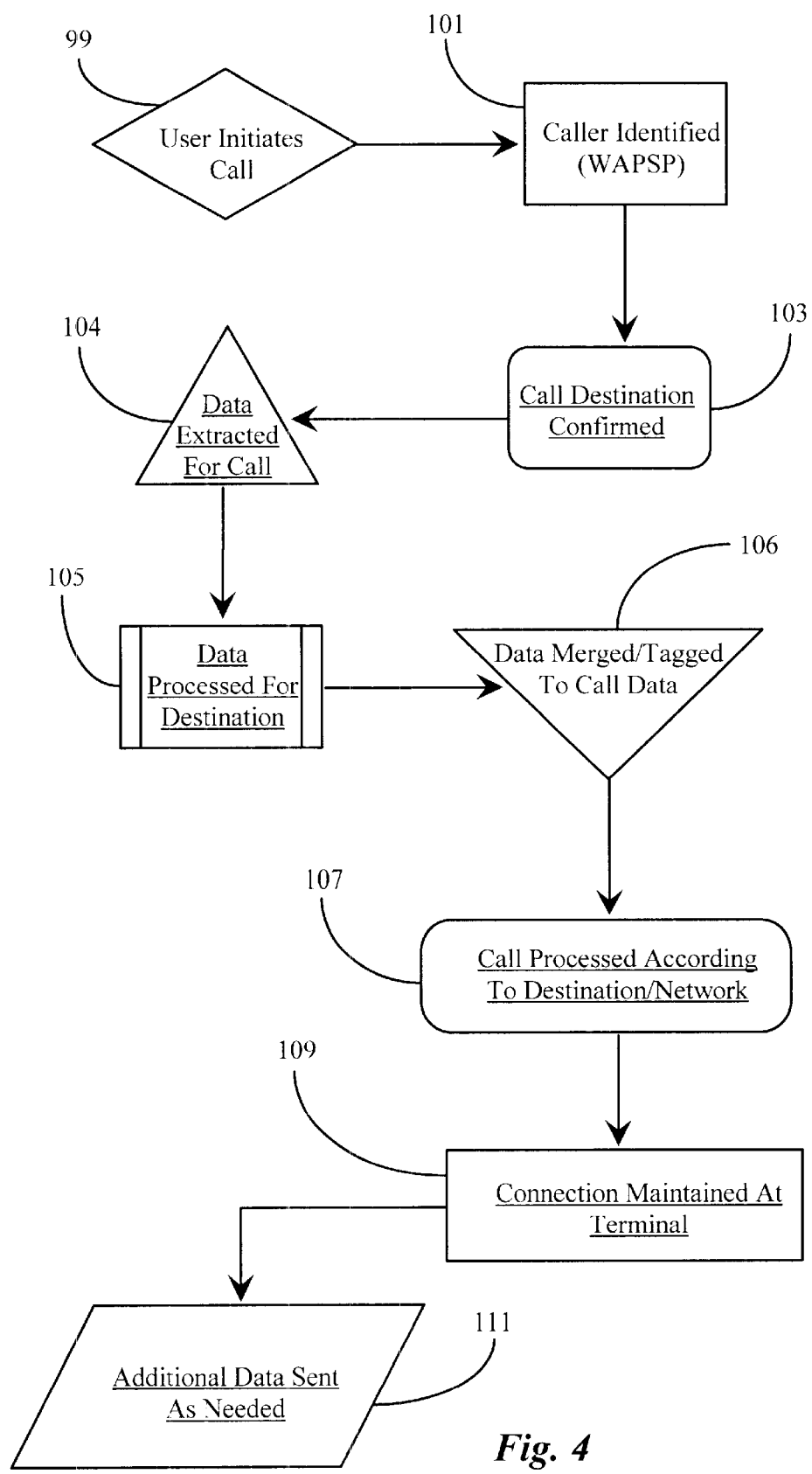
FIG. 4 is a process flow diagram illustrating logical steps for integrated communication center interaction with a WAP user according to an embodiment of the present invention.

FIG. 4 is a process flow diagram illustrating logical steps for integrated communication-center interaction with a WAP user according to an embodiment of the present invention. At step 99, a user connected to a WAP-SP of the present invention requests a call be placed. The user is authenticated at step 101. As previously mentioned, this may require both device and user authentication processes for operation on the network.

Assuming a connected WAP user initiates a call request, then at step 103, a requested call destination is confirmed. At step 104, applicable profile data (determined by rule and pre-agreement) is extracted for sending with a call. At step 105, the data extracted in step 104 is processed for transmission to the call destination confirmed at step 103.

At step 106, data is further processed by tagging the data with call parameters if sent separately, or merged with the call if the call in progress is a DNT call. In some instances of DNT application additional data may still be sent separately from the actual DNT call. At step 106, data is WAP processed according to receiving device and destination network. At step 109, communication and data transfer connections are monitored and maintained by the WAP-SP terminal. At step 111, additional data from WAP-SP 23 is sent if required or as needed. Return data is also processed accordingly to WAP protocol.

It will be apparent to one with skill in the art that the method and apparatus of the present invention may be used in any communication network capable of supporting and connecting the various network entities described and illustrated in the specification without departing from the spirit and scope of the present invention. There are many combinations and varying architectural schemes possible.

It will also be apparent to one with skill in the art that the process steps illustrated herein may be varied in description and order depending on the exact communication application undertaken by a WAP user operating through WAP-SP 23. Functionality attributed to intelligent routing may depend on the "state" of communication taking place between a WAP user and a third party, such as whether or not the third party is a communication center connected to from the WAP-SP and so on. There are many alternate embodiments of the present invention as well as those embodiments already described herein. Therefore, the methods and apparatus of the present invention should be afforded the broadest scope possible. The spirit and scope of the present invention should be limited only by the claims that follow.

What is claimed is:

1. An Internet-connected wireless access protocol service provider (WAP-SP), comprising:

a wireless communication interface for communicating with a WAP-enabled appliance;

a telephony communication interface;

a data repository storing user data; and a software suite;

characterized in that the software suite presents an interface to a user at the WAP-enabled appliance, enabling the user to initiate a live voice call, and then routes the call according to pre-programmed rules in response to the user initiation to a selected destination, and data associated to the user initiating the call is retrieved from the data repository and sent along with the call to the destination.

2. The WAP-SP of claim 1 wherein the telephony interface is an Internet connection, and the calls placed and routed are IPNT calls in the Internet.

3. The WAP-SP of claim 1 further comprising a connection-oriented switched-telephony (COST) trunk line into a public-switched telephony network (PSTN), wherein the calls placed and routed are calls in the PSTN.

4. A system for routing telephony calls initiated by a user of a wireless application protocol (WAP)-enabled device, comprising:

a software-enhanced WAP service provider (WAP-SP) connected to the Internet, connected by WAP protocol to the WAP-enabled device, and connected to a telephony network;

an Internet-connected server hosted by an enterprise;

a call center connected to the telephony network and hosted by the enterprise; and a dedicated data link separate from the telephony network connection connecting the WAP-SP and the call center;

characterized in that the WAP-SP, by virtue of the software enhancement, enables the user to request a telephony connection to the call center, and routes the requested call via the telephony network to the call center, and wherein data associated with the user is transferred over the dedicated data link to the call center parallel to a live voice call routed via the telephony network.

5. The system of claim 4 wherein the telephony network is the Internet, the calls routed are Internet-protocol network telephony (IPNT) calls, and the call-center is enabled to handle IPNT calls.

6. The system of claim 4 wherein the telephony network is a public switched telephone network (PSTN) and the call center is enabled to handle PSTN calls.

7. A method for placing a telephony call by a user of a WAP-enabled appliance to a call center hosted by a host of a WEB service, comprising steps of:

(a) connecting to a hosted WEB service by the WAP-enabled appliance through a wireless-application protocol service provider (WAP-SP);

(b) initiating a live voice call by the user at the WAP-enabled appliance through an interface provided by the WAP-SP;

(c) placing the call to a call center hosted by the host of the Web service through a telephony network connected to the WAP-SP; and (d) retrieving data associated with the user from a data store accessible to the WAP-SP, and forwarding the data with the call.

8. The method of claim 7 wherein, in step (c) the telephony network is the Internet, and calls placed are Internet Protocol Network Telephony calls.

9. The method of claim 7 herein, in step (c), the telephony network is a connection-oriented switched-telephony (COST) network, and the calls placed and routed are calls in the COST network.

10. The method of claim 7 wherein telephony functions are provided by software executing on a CTI processor connected by a CTI link to the WAP-SP.

11. The method of claim 10 wherein the CTI processor comprises a separate data network link, other than the telephony network, to a CTI processor at the call center, and further in step (d) data associated with the user is retrieved from the data store accessible to the WAP-SP, and forwards the data with the call over the separate data network link.

* * * * *